Nov. 28, 1944.   A. E. R. POLLARD   2,363,688
PACKING
Filed Oct. 12, 1942
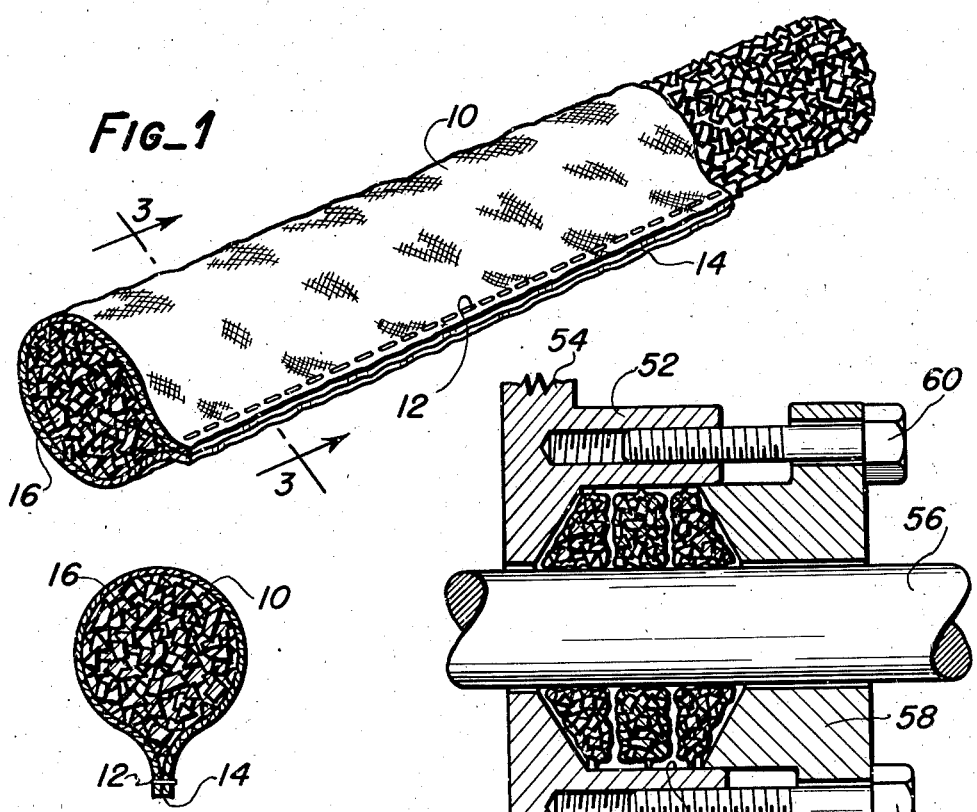
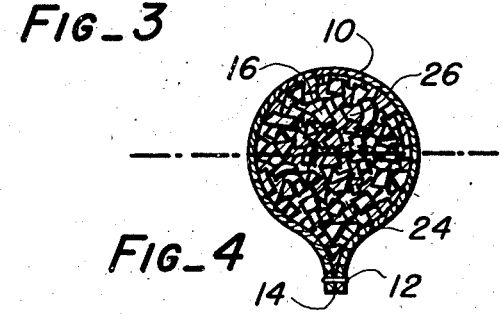
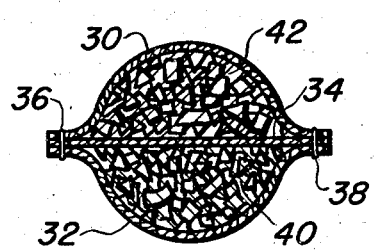
ANNA E. RAINS POLLARD
INVENTOR
BY Herbert E. Smith
ATTORNEY Patented Nov. 28, 1944

2,363,688

UNITED STATES PATENT OFFICE 2,363,688

PACKING

Anna E. Rains Pollard, Spokane, Wash.

Application October 12, 1942, Serial No. 461,651

1 Claim. (Cl. 288—8)

This invention relates to packing and more particularly to that stuffing material used to effect a tight joint between shafts, rods and the like, and a stuffing box of a mechanism.

In the prior art it is well known to form a packing mass of metallic or semi-metallic particles. In certain of these mixtures or masses, metallic and non-metallic particles are mixed in varying proportions and enclosed in a flexible casing for convenience of handling before and during the packing operation, as in packing a gland or stuffing-box. It is also well known in the art to cause said particles to adhere together in an agglomeration, throughout which the metallic and non-metallic particles of varying sizes and shapes are rather completely intermingled. It is also well known to employ an agglutinate of various types of discrete particles in which various waxlike or paraffin substances are used, both for binding the particles of the mass together and also for purposes of lubrication. With all of this prior knowledge there are still important defects in the art which have never been satisfactorily solved. For example, one such defect has been the inability of the mass to adjust itself to maintain the initial tightness of the packing as the particles shift or wear during use tending to loosen or become unpacked. To put it another way, the masses of the prior art packing are relatively non-resilient or non-elastic, and do not have the power to spring back or enlarge when the compressive force is removed or lessened.

Throughout this specification, I use terms which I propose to define for clarity of understanding. The term "discrete" applied to particles describes their characteristic of being non-continuous or distinct units. The term "agglutination" is meant to describe a mass of particles which are caused to adhere together under ordinary temperatures for convenience of handling. The terms "oil-resistant rubber" are employed as a ready means of identifying the medium from which the elastic or resilient particles are formed having important characteristics that distinguish it from the ordinary types of rubber. Such a distinction is its property to resist the deleterious effect of oil or other oil-base products. The term "Neoprene" is used for the purpose of the example only, and is not to be considered as limitative.

Having in mind the defects of the prior art, it is an important object of my invention to provide a packing mass for stuffing boxes and the like in which an inherent characteristic is elasticity or resiliency of the mass while under compression.

Another object of my invention is to provide, in a packing of the type described, a deformable element which will readily accommodate compressive forces and which will spring back upon the slackening of that compression.

A still further and more specific object to my invention is to provide, in a packing of the type described, a deformable or elastic element that is not deleteriously affected by lubricants customarily employed in association with such packing, in use or previous thereto.

Another further object of the invention is the provision of a rope-like packing mass having a deformable or elastic portion that is so positioned as to be away from the point of wear that comes upon the packing during use and which will accommodate the packing to varying degrees of compression.

Still another and further object of the invention is the provision in a packing of an elastic or deformable element in the total mass of packing, which element lies in the mass in a localized manner.

The foregoing objects and others ancillary thereto I prefer to accomplish as follows:

According to the preferred embodiment of my invention, I provide a flexible casing of fabric or other suitable material, in which is placed a mass of discrete particles. Specifically, it is my preference to cause said particles to adhere together in an agglutination for convenience of handling, and for lubrication purposes. A portion of the particles of the mass are preferably formed of an elastic medium that is not deleteriously affected by lubricants, the composition of the elastic medium in this use being an important phase of my invention. I also deem it preferable to localize the elastic medium in the mass so that in use the packing will have a wear-resistant portion lying adjacent the point where the greatest wear takes place, and an elastic medium disposed away from that point of wear but in a manner so that tension is constantly being applied to the wear-receiving portions. The elastic medium is one that is substantially permanently resilient, in order that a stuffing-box may be packed with a packing mass that will function perfectly over long periods of time without further attention or with a minimum of attention at the most. With such combined elastic and non-elastic discrete particles to form a packing mass and the whole encased so that the elastic portion is localized, my packing is readily used, easily installed and the resilient or elastic portion will serve as a tensioning means throughout the useful life of the packing.

The novel features that I consider characteristic of my invention are set forth with particularity in the appended claim. The invention itself, however, both as to its organization and method of use, together with the additional objects and advantages thereof, will best be understood from the following description of specific embodiments, which read in connection with the accompanying drawing, in which Figure 1 is a perspective view of a section of encased packing, Figure 2 is a cross-sectional view taken through a stuffing box or gland, showing the relation of the packing courses therein, Figure 3 is a cross-section of the packing device of Figure 1 taken on line 3—3 thereof, Figure 4 is a cross-section similar to the showing of Figure 3, but wherein certain portions of the packing mass are localized, Figure 5 is a cross-sectional view of a modified form of packing strip, Figures 6, 7 and 8 are perspective views of typical shapes of the particles of the discrete packing particles.

Packing, to overcome the defects hereinbefore enumerated, must have at least two totally distinct characteristics; it must be capable of conforming to the shaft and boxing in which it is packed and thereafter be elastic or resilient; and it must also be resilient or elastic without deleterious deterioration during long periods of use, especially in the presence of lubricants. Referring to Figure 1 of the drawing, an elongated casing 10, preferably of closely woven mesh or fabric material is formed in the shape of a tube. In this casing I place the mass of packing units or particles. The casing is shown as formed of a strip of cloth having its edges secured by stitches 12 to form a hem 14. It will be apparent, however, that this casing could be knitted or woven or even formed as a continuous tube, under certain circumstances, without the hem running along one side.

The packing material as a whole is designated by the numeral 16 and comprises an agglomeration of particles shown typically in Figures 6, 7 and 8. It is no particular characteristic of this invention that the particles be exactly as shown in Figures 6, 7 and 8, although one important desired characteristic is that the particles have a plurality of smooth and preferably flat faces. Certain of the particles are non-elastic being either fibrous or metallic, and certain others of the particles are elastic or resilient. In addition, it is customary to mix fibrous particles in the mass for filler and for lubricating purposes, in which event the fibrous particles are usually impregnated with a lubricant which they exude during use.

With respect to the metallic particles of the packing mass, I have found that a metal preferably having a leaden base and including antimony and tin is most satisfactory. Certain porous metals capable of taking in, and retaining for later exudation, a lubricant are also highly useful.

As for the fibrous particles, I preferably use wood that is cut to various shapes, somewhat as shown in Figures 6, 7 and 8, wherein, as before mentioned, there are flat or smooth faces. These wooden or fibrous particles are immersed in a bath of lubricant to such an extent that they take into themselves a substantial quantity of the lubricant.

The lubricant-impregnated particles of the mass act as a lubricant reservoir, from which the lubricant is drawn by a combination of the normal frictional heat and the osmotic action. This lubricant is drawn through the area of the packing to the rod, stem or shaft, and acts as a sealing agent as well as a lubricant.

The elastic or resilient particles are preferably formed of an elastic medium that is not deleteriously affected by the oil or other lubricants in contact with which they are used. As an example only, one such substance as I have found highly useful for the elastic medium is chloroprene rubber product distinguished by the tradename of "Neoprene." Not only does this particular type of rubber resist oils, but it also resists chemicals, heat, aging, light and ozone for long periods of time. Resistance to abrasion is also an important characteristic. It will be understood, of course, that I do not, by this specific mention of "Neoprene," propose to limit myself to that product exclusively, but am merely mentioning it for purposes of exemplifying my invention.

An important function of the elastic particles employed in my mass is not only the tensioning of the mass, should it become loose or open during use, but also the filling or accommodation of the extra space for the maintenance of vacuum. In this way and by this action the packing maintains vacuum and eliminates the use of seals or lantern rings in stuffing boxes, thus precluding leakage which might otherwise occur.

According to my method, in preparing my packing material, the fibrous particles are shredded or cut to the typical shape and in such a manner so that as many of the cells or pores will be exposed to absorb as much of the lubricant or oil as possible. These fibrous particles are immersed in a hot bath of oil for several hours until they have absorbed all the oil that they possibly can.

The metallic particles are also bathed in oil so that they become thoroughly coated and, where possible, saturated with the lubricant.

According to various proportions, a quantity of the metallic and elastic or fibrous and elastic or fibrous, metallic and elastic particles are mixed into a mass. For convenience in handling, I bind this mass of discrete particles together into an agglutination. I have found that beeswax, paraffin, or other waxlike substance forms an excellent agglutinate due to the fact that they impart lubricating qualities as well as have a melting point which is substantially above normal temperature, and will maintain the mass in a plastic or semi-plastic state.

Such a mass is probably best described as agglomeration due to the fact that the various types of particles are gathered in a haphazard manner as a result of the mixing.

In certain forms of my invention, useful for specific application, I prefer to localize the elastic particles in one portion of the mass. As shown in Figure 4, the elastic or rubber-like particles are localized along the hem 14 throughout the length of the casing. This localized zone is designated by the numeral 24. In zone 26 adjacent thereto will be found the metallic or fibrous or compounds of metallic and fibrous particles, as the case may be.

According to the showing of Figure 5, a modified form of casing is employed. In this casing, two casing halves 30 and 32 divided by a septum 34 are joined at stitched hems 36 and 38 running throughout the length of the casing. In this instance it would be preferable to place the elastic particles in the zone 40 and the non-elastic particles in the zone 42, thus localizing each from the other, the septum or webbing 34 constituting the localizing means.

In use, the packing of Figures 1 and 3, as well as that of Figures 4 and 5 is placed in the receiving compartment 50 of the stuffing-box 52 which usually extends from a wall 54 of a mechanism having a rod or shaft 56 which is to be packed. The gland or follower member 58 is also inserted into the compartment 50 and compression between the end of the gland and the bottom of compartment 50 is obtained by means of bolts 60. In the showing of Figure 2, three courses or rings of packing are positioned in the compartment 50 and in intimate contact with the external face of shaft 56. The bolts 60 are usually tightened down to pull the gland into the stuffing-box sufficiently to form a fluid-tight seal around the shaft 56.

In many, if not all instances, it is to be preferred by the operator of a machine that such glands require no further attention. However, wear and readjustment of the contracting particles of the packing mass, as well as shifting in the mass, will, on occasion, permit leakage with the packing of the prior art. By including in my packing mass elastic particles, it will be seen that when the initial compression is applied to the packing, these particles will be deformed due to the fact that they are softer than the other particles of the mass. Thus, and thereupon, should wear or adjustment or movement or shifting take place, the deformed elastic particles will reform themselves as permitted and accommodate what would otherwise be looseness in the ordinary forms of discrete packing material.

In the case of the forms of my invention shown in Figures 4 and 5, it is preferable to pack a stuffing-box with the packing so that the localized elastic particles will be disposed away from the shaft being packed. The hem 14 serves as a telltale means when the elastic particles lie therealong, so that the person effecting the installation will readily be able to distinguish and to place the elastic portions of the mass as desired. It will also be apparent that a colored thread may be run through the casing or the casing may be printed or otherwise marked so that a telltale would appear from the outside of the casing in those instances where the elastic portion of the mass is localized.

In most instances it is desirable that the casing be flexible but I believe it readily apparent that the important characteristic of the casing is that it merely serves for the handling of the packing mass previous to placement within the stuffing-box.

Although I have shown and described certain specific embodiments of my invention, I am fully aware that many modifications thereof are possible. My invention, therefore, is not to be restricted, except insofar as is necessitated by the prior art and the spirit of the appended claim.

Having thus described my invention, I claim:

A packing, comprising: a tubular fabric casing having a projecting seam running along one side thereof, a mass of discrete non-elastic metallic and oil-soaked wooden particles within said casing, a separate second mass of discrete particles within said casing localized along the projecting seam thereof, said second mass being formed of elastic material, and an agglutinate interspersed in said masses to bind the same together, said projecting seam serving as an indicator of the locality of the elastic mass within said casing to facilitate the proper installation of the packing.

ANNA E. RAINS POLLARD.